Figure 1:
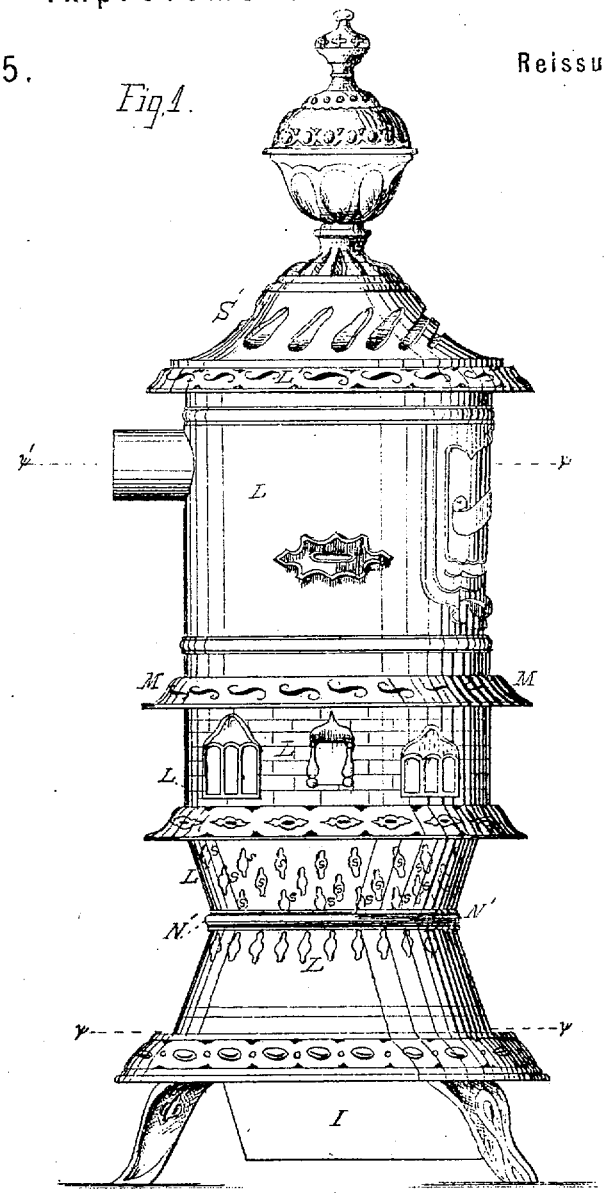

2 Sheets--Sheet 1.

DENNIS G. LITTLEFIELD.

Improvement in Base Burners.

No. 4,585. Reissued Oct. 10, 1871.

Witnesses:

H J Stackole
Chas S Collins

Inventor:

Dennis G Littlefield

AM. PHOTO-LITHOGRAPHIC CO. N.Y. (OSBORNES' PROCESS.)

DENNIS G. LITTLEFIELD.

Improvement in Base Burners.

No. 4,585. Reissued Oct. 10, 1871.

Witnesses.

H. P. Stacpole

Chas. S. Collins

Inventor:

Dennis G. Littlefield.

AM. PHOTO-LITHOGRAPHIC CO. N.Y. (OSBORNE'S PROCESS.)

UNITED STATES PATENT OFFICE.

DENNIS G. LITTLEFIELD, OF ALBANY, NEW YORK.

IMPROVEMENT IN BASE-BURNERS.

Specification forming part of Letters Patent No. 30,333, dated October 9, 1860; antedated July 3, 1860; reissue No. 1,303, dated April 22, 1862; reissue No. 4,585, dated October 10, 1871.

DIVISION A.

*To all whom it may concern:*

Be it known that I, DENNIS G. LITTLEFIELD, of Albany, in the county of Albany and State of New York, have invented a new and Improved Mode of Constructing Hot-Air Furnaces by which they are more perfetly adapted for a parlor furnace as well as for a double-heating furnace; and I do hereby declare that the following is a full and exact description thereof, reference being had to the accompanying drawing and to the letters of reference marked thereon, like letters in the several figures indicating the same parts.

For a proper definition of the words stove and furnace we must have recourse to the definition of those terms adopted by experts in the art to which they relate. A stove, as distinguished from a furnace, is a receptacle for burning fuel which radiates its heat direct from its surfaces to the room to be warmed. A furnace is a similar receptacle placed within and surrounded by a covering placed a little space apart from the stove, so as to admit the passage of a column of cold air at the base of the inclosed space to absorb the heat from the stove and transmit it to the space to be warmed.

My improvement consists in the employment of a cold-air channel (one or more) at the base; and a series of perforations in the covering opposite the most intensely-heated part of the stove, and a top fixture to the covering, for the purpose of controlling the passage of the heated air; thus constituting a device that can be used as a parlor-furnace, warming the room where placed by heated air combined with direct radiation, or by reverberated heat in conjunction with radiated heat; or, as a double-heating furnace, warming the room where placed by direct radiation, and rooms above by heated air.

The organization which I employ is so constructed that when used for warming close rooms the objectionable "stove smell" and oppressive and parching sensation usually experienced in rooms when thus warmed are obviated. The reason why such objections are obviated is this, that while the apparatus is so organized as to compel the cold air from without immediately upon its entrance, to come in direct contact with all sides of its most heated portion, it at the same time prevents the impure air within the room from coming in contact with such heated portion and the consequent burning of the impurities held by it in suspension. Moreover, the objectionable qualities of the heat given off by direct radiation through the series of openings opposite such most heated portion are neutralized, as it were, or subdued by the heat absorbed by or imparted to said cold air by contact with the fire-pot at the instant of its entrance, and thus, in a modified state, the heat of direct radiation may be made to pass into the room at the base of the furnace in conjunction with heated fresh air.

In order to adapt a hot-air furnace to serve these purposes, I surround a fuel-receptacle resembling a stove with a casing of metal through which the ash-pit, the collar for the smoke-pipe, and the feed-door project. Provision for the supply of air is made by a conductor which communicates with the external atmosphere, so that the room is supplied with a larger quantity of air to support combustion than is taken from it for such purpose, the practical advantage of which is that it ventilates the room in a proper manner, to wit, by giving a constant supply of pure air in quantity sufficient to preserve a *plenum*, thereby preventing cold air from coming into the room through the chinks at the windows and doors leading outside, or to halls or passages where the air is cold. By such action of this furnace a uniform heat can be maintained in portions of the room most distant from it, while at the same time a portion of the heat being radiated in a direct line from the surface of the fire-pot through the openings in that portion of the covering surrounding it, the space near the furnace is made warm by direct radiation, so that persons coming in from out of doors can warm their feet and hands the same as by a stove.

Figure 2:
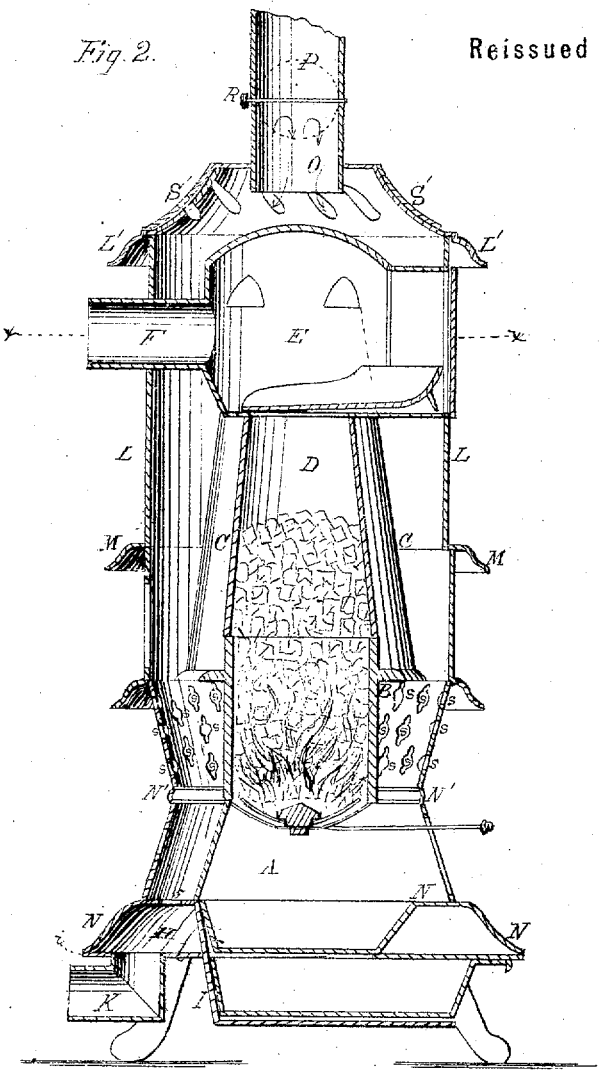

By this organization when the weather is very cold, and it is desirable to get up a quick heat about the furnace, or when the furnace is being put in operation in a room that is cold, a person can, by closing a damper, R, and register S′, shown in Fig. 2, concentrate the heat to a space immediately about the furnace until such space is warm; after which, by throwing open the register, the whole space of the room may be warmed uniformly. Or he may, without opening the register, open the damper, and by a conductor, P, cause currents of heated air to be conveyed to warm rooms above. Thus the damper for the center outlet to the room above the register on the top of the covering, forming an outlet for the heated air to the room in which the furnace is situated, and the openings in the covering surrounding the fire-pot enable the operator to apply the heat to such points as required. These capabilities or functions may all be brought into action when the furnace is adapted as a double-heating furnace; but when adapted as a parlor-furnace, warming only the room in which it is situated, the damper is dispensed with, and a cover or urn, as shown in Fig. 1, takes its place, in which case the currents of heated air are wholly controlled by the register.

My apparatus thus becomes an organization perfectly adapted for use either as a parlor-furnace, warming only the room where situated, or as a double-heating furnace, warming the room in which it is situated, and one or more separate rooms above in addition.

In adapting my improvement a fuel-receptacle of any of the well-known forms employed as stoves may be used, but I prefer one resembling that class of stoves known as base-burning.

Figure 3:
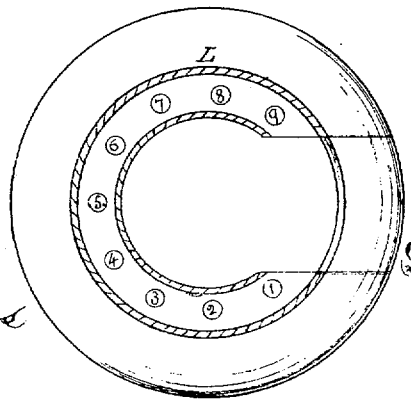
Figure 4:
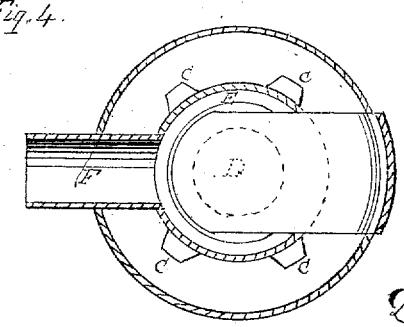

In the accompanying drawing, Figure 1 is a side elevation of my apparatus as used for a parlor-furnace; Fig. 2, a central vertical section, as used for a double heating furnace, and Fig. 3, a horizontal section on the line *x x* of Fig. 1; Fig 4, a horizontal section on the line *x′ x′* Fig. 2.

Similar letters indicate like parts in all the figures.

In said drawing, A indicates the ash-pit; B, the fire-pot; C, the flues; D the magazine for the supply coal; E, the upper chamber through which the fuel is passed to the magazine, and F the collar for the smoke-pipe, all having the construction and arrangement of a base-burning stove. The base N may be of the common form having a series of perforations, 1 2 3 4 5 6 7 8 9 or more, if necessary to distribute the cold air which comes in through the inlet K around the fire-pot B. Beneath this base a channel, H, or cold-air passage is formed by a flat plate of iron, *l*, extending from its outer edge, as at *i*, to the ash-pan case I. This plate, when bolted to the lower side of the base, forms the cold-air channel, H, which is provided with an inlet-pipe, K, to which an air-conductor may be applied to communicate with the external atmosphere. L is the outer casing or shell, which is made of cast iron from the base to M, above which it may be made of sheet iron. From the base N to the point N′ the casing is contracted for the purpose of causing the cold air as it ascends from the orifices 1 2 3 4 5 6 7 8 9 in the base to impinge against the fire-pot, and also for the purpose of bringing the latticed or perforated portion S nearer the fire-pot, in order that the direct radiation may find more ready egress from the fire-pot to the room. The top of the casing at L′ is made of cast-iron, and perforated, as shown in the drawing, and has an annular cast plate, S′ correspondingly perforated and fitted to revolve thereon, so as to form a register to regulate the escape of the currents of heated air into the room in which the furnace is situated. For the purpose of allowing the heated air to pass to the room or rooms above, a central opening, O, is provided in the top of the casing, the perforated register-plate S′ turning around it, and from this opening a pipe, P, projects, having a damper, R, to prevent the passage of heat to the upper rooms whenever it is desirable to apply all the heat of the furnace to the room in which it is placed. The dotted lines in Fig. 2 represent the damper open, but when closed, as shown in full outline in the same figure, the currents of heated air reverberate, as represented by the arrows, and pass out by the register S′, if the same be open; or, if closed, the whole casing becomes highly heated, yet the fuel-receptacle within is prevented from being destroyed by overheating owing to the relief afforded by the outlets S for the escape of the reveberated heat opposite the fire-pot. Again, by closing the register S′ more or less, as occasion may require, more or less of the heated air will be reverberated out opposite the fire-pot, or pass by the register S′ to the room in which the furnace is placed. If the register be entirely closed (the damper being also closed) an intense heat, which is sometimes desirable, may be generated around the furnace, the reverberated heat in such case passing out as a back or return current through openings S and into the room near the floor in conjunction with the heat of direct radiation from the fire-pot itself, and also the heated fresh air which, in a cold state, comes up through the inlet K; and if, on the other hand, the damper be opened and the register closed, almost the entire heat, except that radiated directly from the fire-pot through the the latter perforations will be carried into the room above.

It will thus be seen that the organization which I have described may be used as a double-heating furnace, warming rooms above by a current of heated air, and the room where situated by direct radiation; and when thus adapted can, at the will of the operator, be made to apply all its heat to the room in which it is situated either by reverberated heat combined with radiated heat from the fire-pot, or by radiated heat from the fire-pot and heated air passing from the top of the furnace to said room; or that it may be adapted and used solely as a parlor-furnace, warming the said room by direct radiation through the lattice-work or perforation, while heated air is passing from its top into the upper part of the room; or, when desirable, by direct radiation in conjunction with reverberated heat commingled with an ascending atmospheric current, the register being closed.

Having thus described my invention, what I claim as new and of my invention is—

1. The combination of the cold-air chamber H, the perforations S S S S, the register S′, and the damper R, as described.

2. Combining, in hot-air furnaces, the shell or covering L, the register S′, for opening and closing the top of the shell, as set forth, the perforations S S S S, opposite or near the fire-pot, and the cold-air channel H, substantially as above described.

DENNIS G. LITTLEFIELD.

Witnesses:
CHAS. S. COLLINS,
H. P. STACKPOLE.

(154)